US008123190B2

(12) United States Patent
Kost

(10) Patent No.: US 8,123,190 B2

(45) Date of Patent: Feb. 28, 2012

(54) ADJUSTABLE UMBRELLA MOUNT

(75) Inventor: Thomas L. Kost, Baxter Springs, KS (US)

(73) Assignee: Thomas L. Kost, Baxter Springs, KS (US)

( * ) Notice: Subject to any disclaimer, the term of this patent is extended or adjusted under 35 U.S.C. 154(b) by 0 days.

(21) Appl. No.: 12/764,251

(22) Filed: Apr. 21, 2010

(65) Prior Publication Data

US 2011/0260029 A1 Oct. 27, 2011

(51) Int. Cl.
*F16M 13/00* (2006.01)

(52) U.S. Cl. ...................... 248/514; 135/88.08; 224/519

(58) Field of Classification Search .................. 248/156, 248/291, 514, 518, 519, 511, 520, 523, 524, 248/286, 528, 529; 135/88.08, 16, 88.13; 224/519; 280/491.1
See application file for complete search history.

(56) References Cited

U.S. PATENT DOCUMENTS

| | | | | |
|---|---|---|---|---|
| 5,272,583 | A * | 12/1993 | Yerkes | 360/132 |
| 5,374,024 | A * | 12/1994 | Williams | 248/514 |
| 5,911,399 | A * | 6/1999 | Mannion | 248/514 |
| 6,089,246 | A * | 7/2000 | Barnes | 135/88.06 |
| 6,105,594 | A * | 8/2000 | Diaz | 135/16 |
| 6,412,506 | B1 * | 7/2002 | Reese | 135/20.1 |
| 6,607,002 | B2 * | 8/2003 | Reese | 135/88.08 |
| 6,722,380 | B1 * | 4/2004 | Hafer | 135/16 |
| 7,264,218 | B1 * | 9/2007 | Edwards | 248/511 |
| 7,338,062 | B1 * | 3/2008 | Violette et al. | 280/478.1 |
| 7,448,590 | B1 * | 11/2008 | Holton | 248/534 |
| 7,819,128 | B2 * | 10/2010 | Clark et al. | 135/88.08 |

* cited by examiner

*Primary Examiner* — Terrell McKinnon
*Assistant Examiner* — Monica Millner

(57) ABSTRACT

An adjustable mount for an umbrella may include one or more adjustments to allow the umbrella to be secured at different positions both horizontally and vertically. The mount may include a beam that fits into a standard receiver hitch on a vehicle. The mount may be used without the beam to secure an umbrella to a horizontal or vertical surface. The mount may be used to hold other objects besides an umbrella, such as a flag.

9 Claims, 4 Drawing Sheets

ADJUSTABLE UMBRELLA MOUNT

BACKGROUND OF THE INVENTION

The present invention relates to a mounting device and, more particularly, to an adjustable umbrella mount that may be adapted to attach to a vehicle's receiver hitch.

Tailgating is a popular activity where people may gather at, for example, a truck's tailgate, often before sporting events. When tailgating, there is often no protection from the sun. A large, heavy umbrella base, often filled with sand or water, may be used to support an umbrella for shade.

Umbrellas supported in these types of bases may be supported in a fixed position. As the sun moves across the sky, the area shaded by an umbrella also moves. Shade may be lost under an umbrella during certain times of the day.

As can be seen, there is a need for an umbrella mount that may be adjustable and portable.

SUMMARY OF THE INVENTION

In one aspect of the present invention, a mount for securing an object comprises a tower adapted to secure the object, the tower including a height adjustment to vary the height of the object secured in the tower; a tower mount adapted to pivotally secure the tower; and a swivel base adapted to rotationally secure the tower mount.

In another aspect of the present invention, a mount comprises a tower adapted to secure the object, the tower including a height adjustment to vary the height of the object secured in the tower; at least one T-handle adapted to apply pressure to the object within the tower; a plurality of height adjustment holes in the tower; a height adjustment pin fitting in the height adjustment holes; a tower mount adapted to pivotally secure the tower; and a swivel base adapted to rotationally secure the tower mount.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an adjustable mount for an umbrella. The mount may include one or more adjustments to allow the umbrella to be secured at different positions both horizontally and vertically. The mount may include a beam that fits into a standard receiver hitch on a vehicle. The mount may be used without the beam to secure an umbrella to a horizontal or vertical surface. The mount may be used to hold other objects besides an umbrella, such as a flag.

Figure 1:
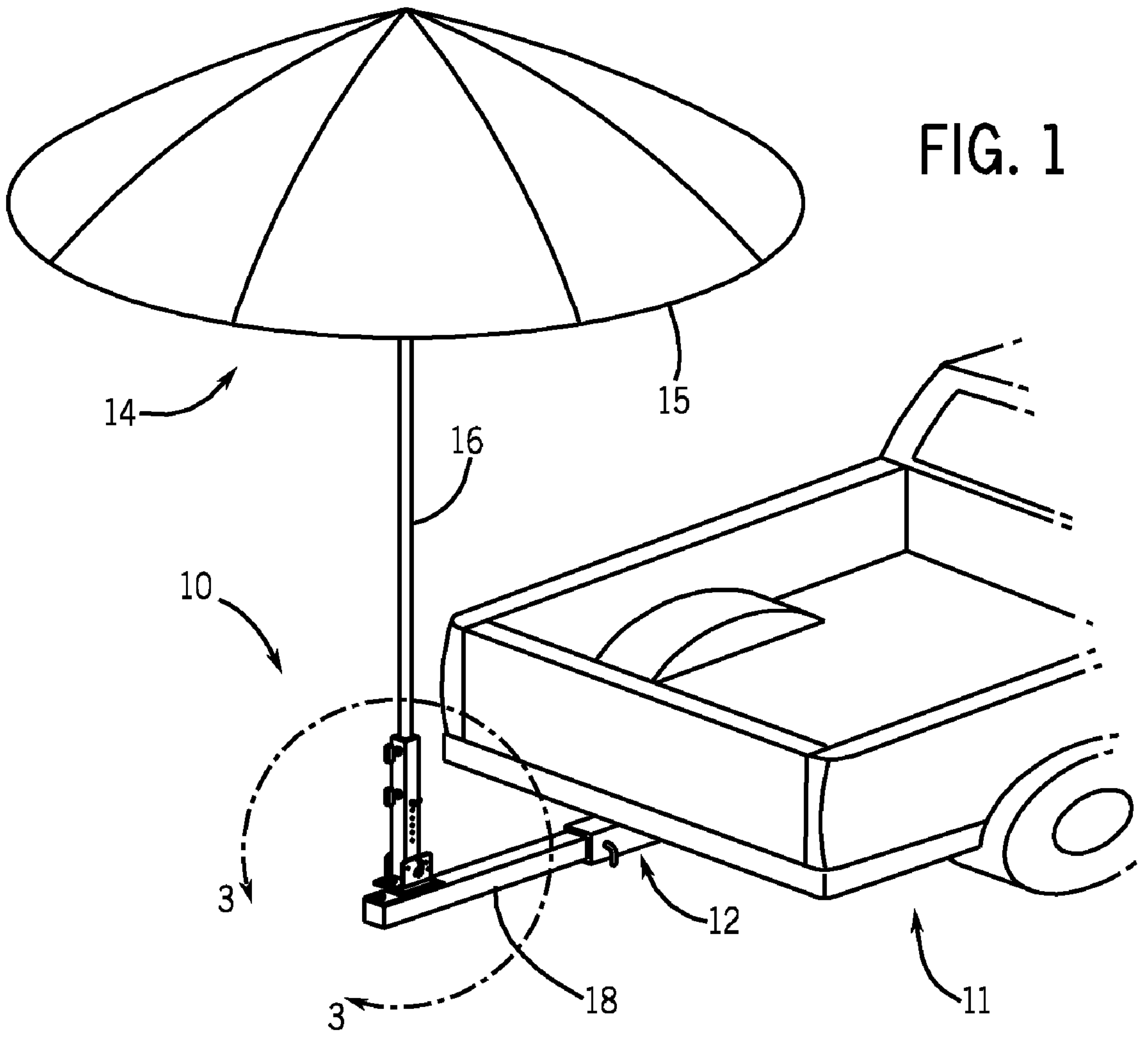
FIG. 1 is a perspective view of the umbrella mount in use according to an embodiment of the present invention.

Referring to FIG. 1, there is shown a mount 10 for an umbrella 14. The mount 10 may attach to, for example, a receiver hitch 12 of a vehicle 11 via a hitch beam 18. The hitch beam 18 may support the mount 10. An umbrella mast 16, supporting the top 15 of the umbrella 14, may fit into the mount 10.

Figure 2:
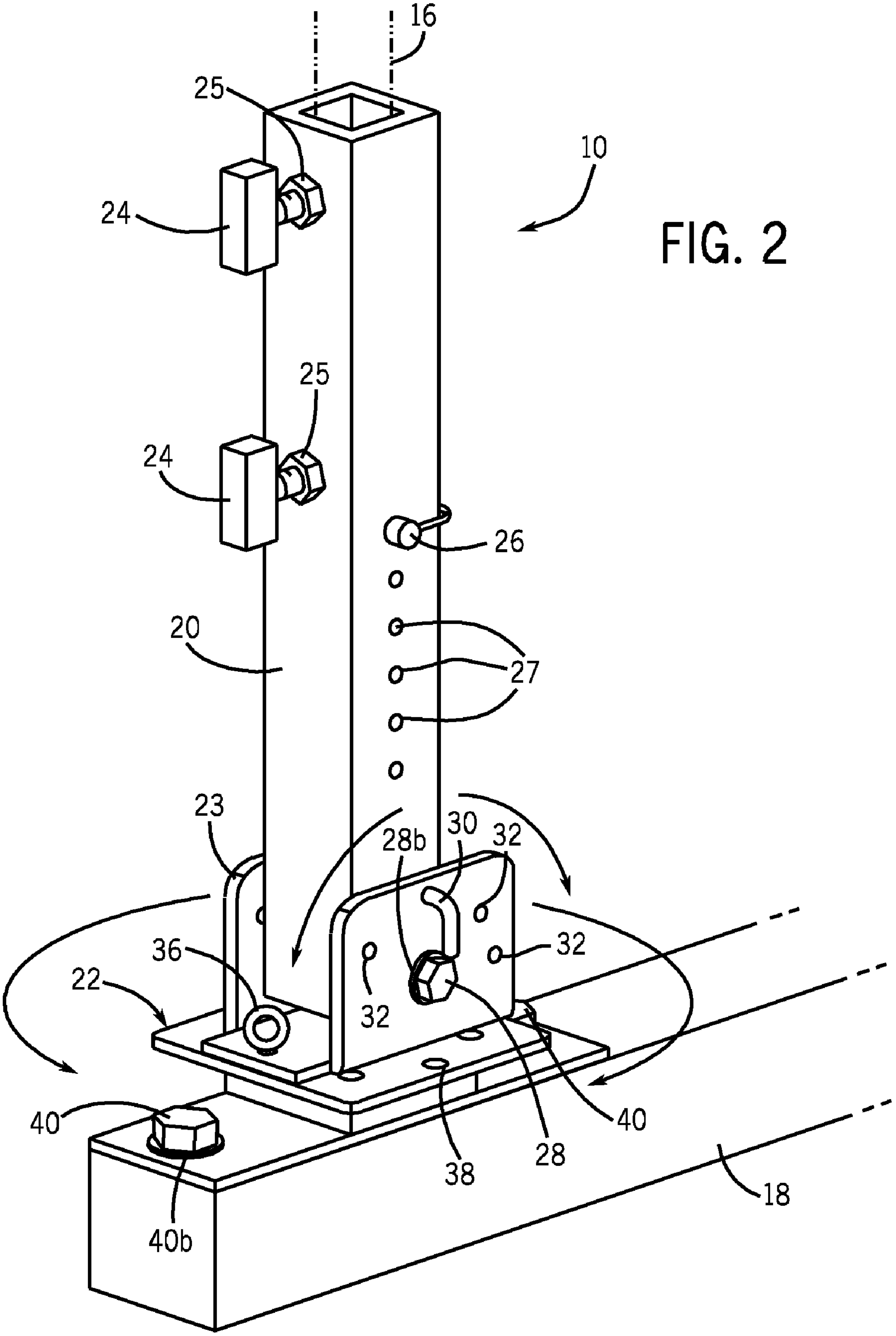
FIG. 2 is a close-up perspective view of the umbrella mount of FIG. 1.
Figure 3:
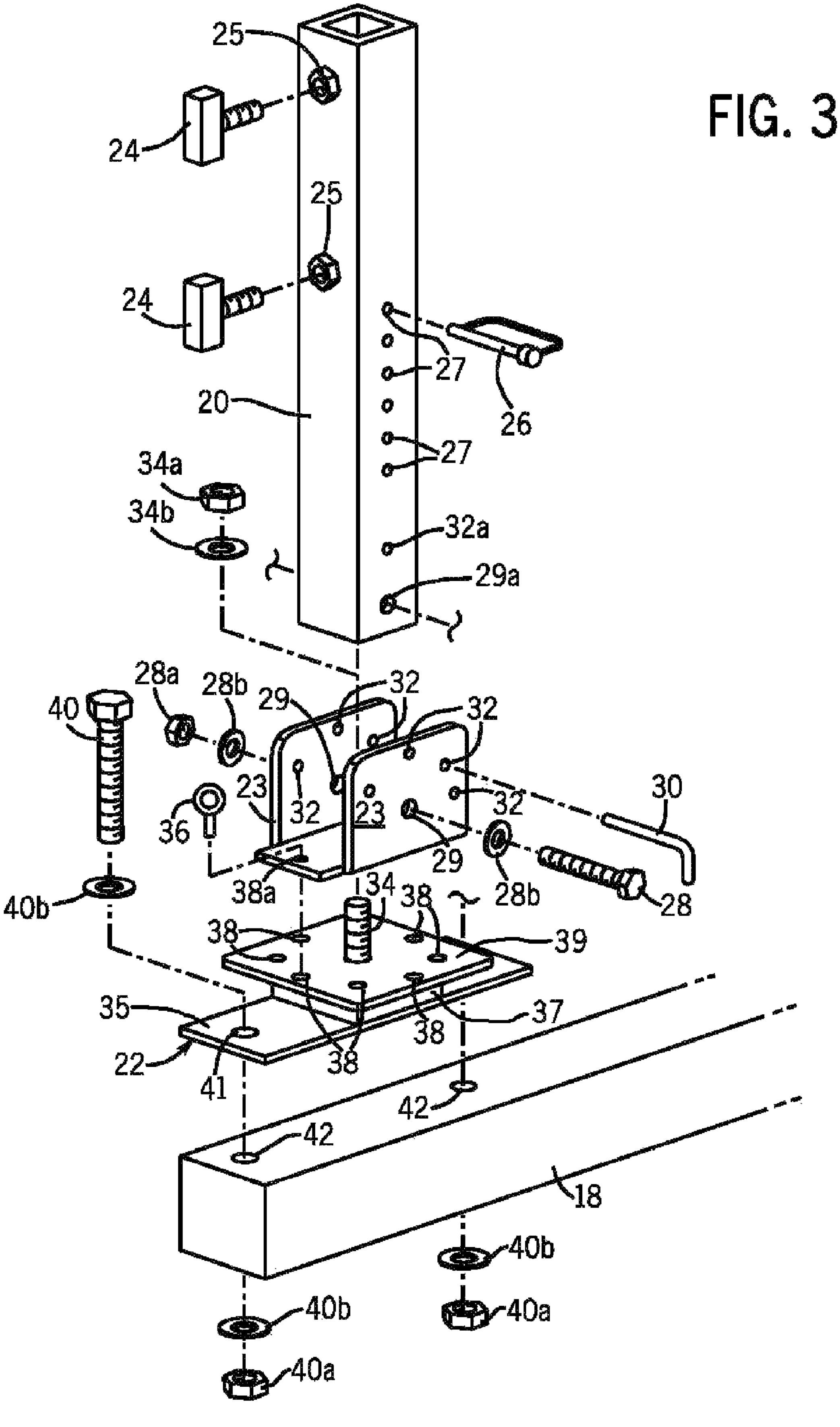
FIG. 3 is an exploded perspective view of the umbrella mount of FIG. 1.

Referring now to FIGS. 2 and 3, the mount 10 may include a tower 20. The tower 20 may be an elongated tubular member into which the umbrella mast 16 may fit. At least one T-handle 24 may thread into the tower 20 via female threads 25. The female threads 25 may be, for example, nuts welded onto the tower 20. The T-handle 24 may press against the umbrella mast 16, inside of the tower 20, as the T-handle 24 is threaded into the tower 20. The T-handle 24 may press directly against the umbrella mast 16 or may slide a securing member (not shown) against the umbrella mast 16.

The tower 20 may further include at least one height control hole 27. In one embodiment, a plurality of height control holes 27 may be present in the tower 20. A height adjustment pin 26 may fit into the height control hole 27. The height adjustment pin 26 may determine the maximum amount that the umbrella mast 16 may be slid inside of the tower 20.

The tower 20 may fit into a tower mount 23. The tower mount 23 may include a hole 29 that may align with a hole **29*a* in the tower 20. A bolt 28 may be inserted through the holes 29, 29*a* to pivotally secure the tower 20 to the tower mount 23. The bolt 28 may be secured with a nut 28*a*. A plurality of washers 28*b* may fit between the head of the bolt 28 and the tower mount 23 and between the nut 28*a* and the tower mount 23. A plurality of pivot holes 32 may be formed in the tower mount 23. The pivot holes 32 may align with a pivot hole 32*a* in the tower 20. As the tower 20 is pivoted about the bolt 28, various pivot holes 32 may align with the pivot hole 32*a*. A tilt lock pin 30 may be inserted through the holes 32, 32*a* to lock in a desired pivot of the tower 20 relative to the tower mount 23. While a plurality of holes 32 has been described, other embodiments for realizing pivot of the tower 20 may be used. For example, the plurality of holes 32 may be replaced with an arc-shaped channel (not shown) through which a bolt may fit to secure the tower 20 at a desired angle relative to the tower mount 23**.

The tower mount 23 may attach to a swivel base 22. The swivel base 22 may include a bottom plate 22, a spacer plate 37 and a top plate 39. The bottom plate 22 may have mounting holes 41 that may align with hitch beam holes 42 in the hitch beam 18. Bolts 40, washers **40*b* and nuts 40*a* may secure the bottom plate 22 to the hitch beam 18. The bottom plate 22 may be, for example, 2¼ inch by 8 inch by ¼ inch steel plate. The spacer plate 37 may be disposed between the bottom plate 22 and the top plate 39. The spacer plate 37 may be from about ½ to about 1 inch thick. The top plate 39 may have a bolt 34 protruding from a central region of the top plate 39. The bolt 34 may be, for example, a ½ inch hardened steel bolt. The bolt 34 may fit into a hole (not shown) in the tower mount 23, thereby securing the tower mount 23 to the top plate 39 with nut 34*a* and washer 34*b***.

The top plate 39 may include a plurality of rotation adjustment holes 38. The tower mount 23 may include at least one tower plate rotation adjustment hole **38*a* that may align with each of the rotation adjustment holes 38** as the tower mount

23 is rotated about the bolt 34. A rotation lock pin 36 may fit though holes 38*a*, 38 to fix the rotation of the tower mount 23 about the top plate 39. While eight rotation adjustment holes 38 are shown in the top plate 39, any number of holes may be present to allow for various rotational adjustments.

Figure 4:
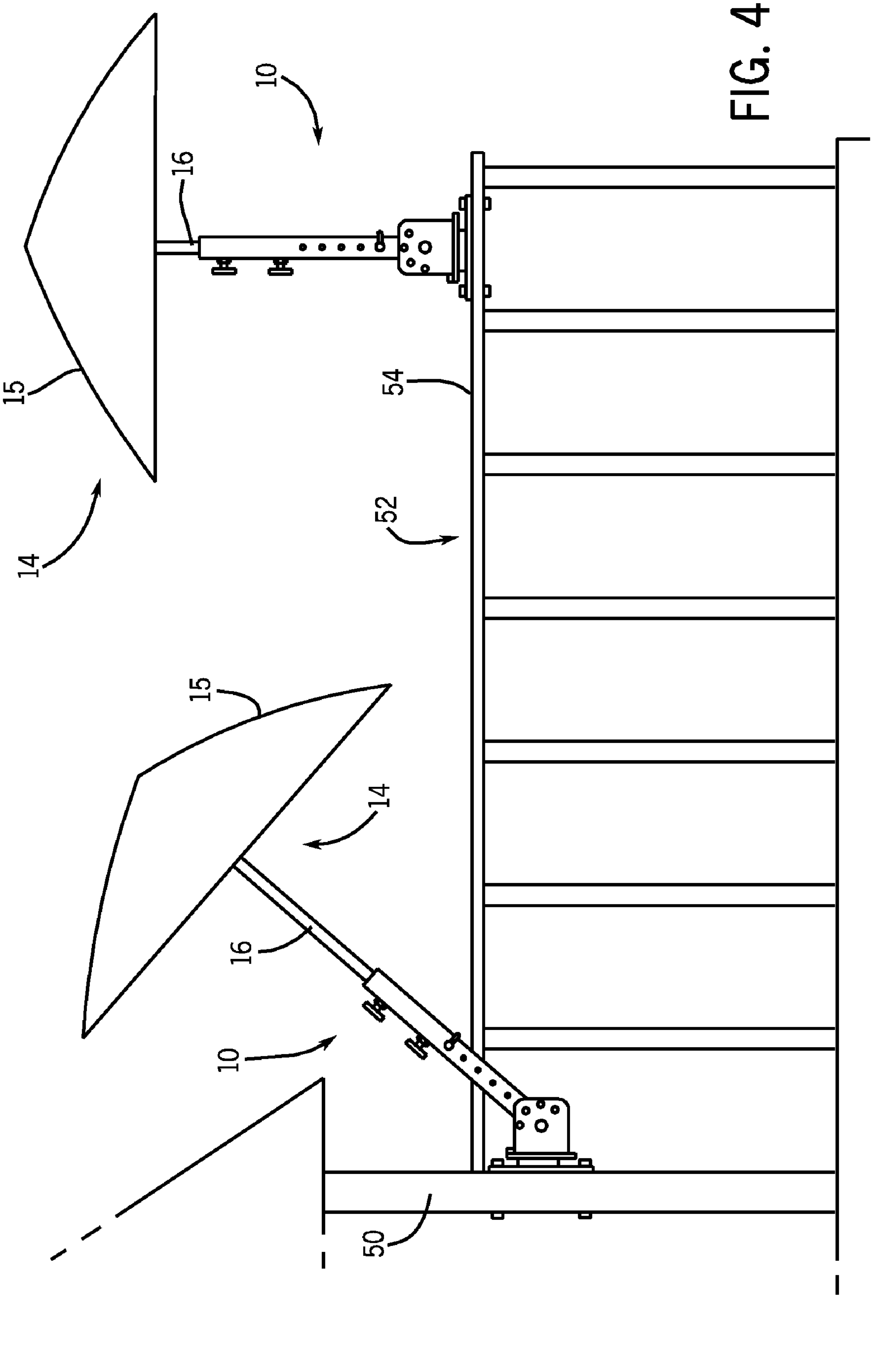
FIG. 4 is a perspective view showing alternate mounting locations for the umbrella mount of FIG. 1.

As shown in FIG. 4, the mount 10 may be used without the hitch beam 18. The bottom plate 35 may be attached to other objects such as the side of a house 50 or the top rail 54 of a deck rail 52.

Figure 5:
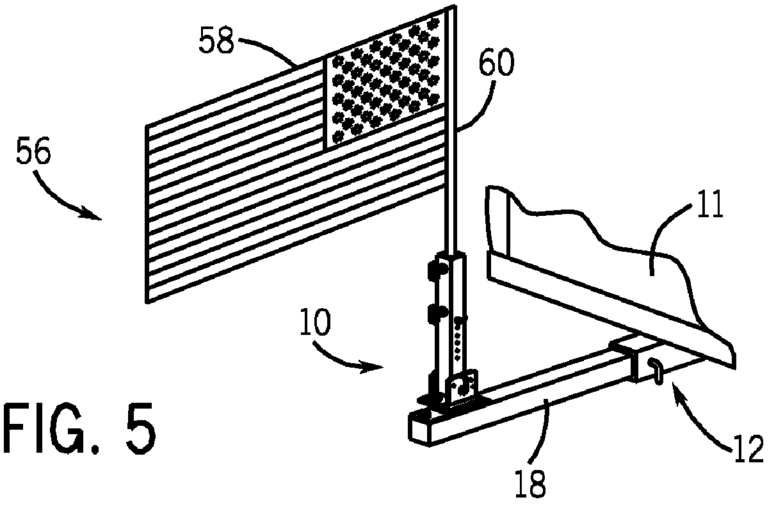
FIG. 5 is a perspective view of the umbrella mount in use to secure a flag, according to an alternate embodiment of the present invention.

As shown in FIG. 5, other objects 56 may be secured in the mount 10. For example, a flag 58 may be attached to a flag pole 60. The flag pole 60 may then fit into the tower 20 of the mount 10.

It should be understood, of course, that the foregoing relates to exemplary embodiments of the invention and that modifications may be made without departing from the spirit and scope of the invention as set forth in the following claims.

I claim:

1. A mount for securing an object, the mount comprising:
- a tower adapted to secure the object, the tower including a height adjustment to vary the height of the object secured in the tower;
- a tower mount adapted to pivotally secure the tower; and
- a swivel base adapted to rotationally secure the tower mount, wherein the swivel base includes:
  - a bottom plate having mounting holes formed therethrough;
  - a top plate attached to the bottom plate;
  - a plurality of rotation adjustment holes disposed about a periphery of the top plate; and
  - a bolt protruding from a central region of the top plate; and
- wherein the tower mount is adapted to mount to and rotate about the bolt protruding from the top plate and the tower mount includes:
  - a tower plate rotation adjustment hole formed through a base of the tower plate; and
  - a rotation lock pin adapted to fit through the rotation adjustment hole and one of the plurality of rotation to lock tower plate into one of a plurality of swivel positions.

2. The mount of claim 1, wherein the tower includes at least one T-handle adapted to apply pressure to the object within the tower.

3. The mount of claim 1, wherein the tower includes a plurality of height adjustment holes and a height adjustment pin fitting in the height adjustment holes.

4. The mount of claim 1, wherein the tower mount includes a plurality of pivot holes and a tilt lock pin fitting in the pivot holes, wherein a pivot of the tower relative to the tower mount is adjusted by fitting the tilt lock pin into a select one of the plurality of pivot hole.

5. The mount of claim 1, wherein the swivel base includes a spacer between the bottom plate and a top plate.

6. The mount of claim 1, further comprising a hitch beam, the hitch beam adapted to secure to a receiver hitch of a vehicle.

7. The mount of claim 1, wherein the object is an umbrella or a flag.

8. The mount of claim 1, wherein the bottom plate includes mounting holes for attaching the mount to a support.

9. A mount comprising:
- a tower adapted to secure the object, the tower including a height adjustment to vary the height of an object secured in the tower;
- at least one T-handle adapted to apply pressure to the object within the tower;
- a plurality of height adjustment holes in the tower;
- a height adjustment pin fitting in the height adjustment holes;
- a tower mount adapted to pivotally secure the tower; and
- a swivel base adapted to rotationally secure the tower mount, wherein the swivel base includes:
  - a bottom plate having mounting holes formed therethrough;
  - a top plate attached to the bottom plate;
  - a plurality of rotation adjustment holes disposed about a periphery of the top plate; and
  - a bolt protruding from a central region of the top plate; and
- wherein the tower mount is adapted to mount to and rotate about the bolt protruding from the top plate and the tower mount includes:
  - a tower plate rotation adjustment hole formed through a base of the tower plate; and
  - a rotation lock pin adapted to fit through the rotation adjustment hole and one of the plurality of rotation to lock tower plate into one of a plurality of swivel positions.

* * * * *